United States Patent [19]

Flowers et al.

[11] Patent Number: 5,122,427
[45] Date of Patent: Jun. 16, 1992

[54] BATTERY PACK

[75] Inventors: Dale M. Flowers, Prospect Heights; James R. Hartmann, Chicago, both of Ill.

[73] Assignee: Skil Corporation, Chicago, Ill.

[21] Appl. No.: 743,166

[22] Filed: Aug. 9, 1991

[51] Int. Cl.⁵ .............................................. H01M 2/10
[52] U.S. Cl. ...................................... 429/97; 429/99; 429/123
[58] Field of Search .................................. 429/96-100, 429/121-123, 158, 159, 163, 1, 9; 307/150

[56] References Cited

U.S. PATENT DOCUMENTS

| | | | |
|---|---|---|---|
| 3,657,021 | 4/1972 | Mathews | 429/123 X |
| 4,584,250 | 4/1986 | Hooke et al. | 429/121 X |
| 4,871,629 | 10/1989 | Bunyea | 429/97 |
| 4,904,549 | 2/1990 | Goodwin et al. | 429/123 X |

Primary Examiner—Anthony Skapars
Attorney, Agent, or Firm—Jones, Day, Reavis & Pogue

[57] ABSTRACT

A unitary rechargeable battery pack includes a plurality of axially aligned battery cells coupled to each other in electrical series with an insulated housing surrounding and enclosing the cells. The housing includes complementary halves detachably connected to each other. First, second and third electrical terminals provide two positive voltages and a common or negative voltage terminal, respectively. First and second and third openings in one end of the battery pack expose the first, second and third terminals for electrical connection. The openings are accessible for connection in a 90° quadrant at one end of the battery pack.

17 Claims, 5 Drawing Sheets

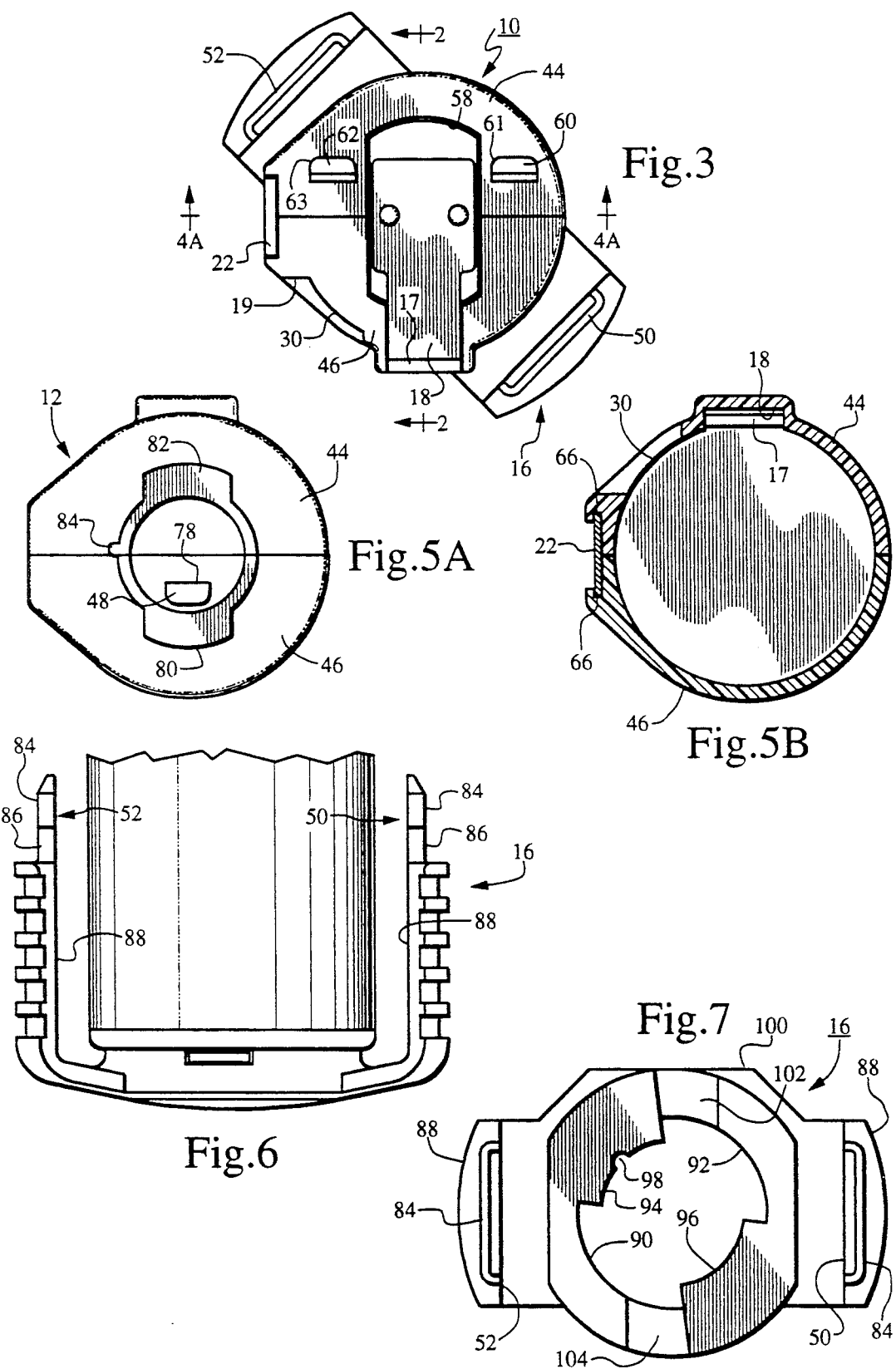

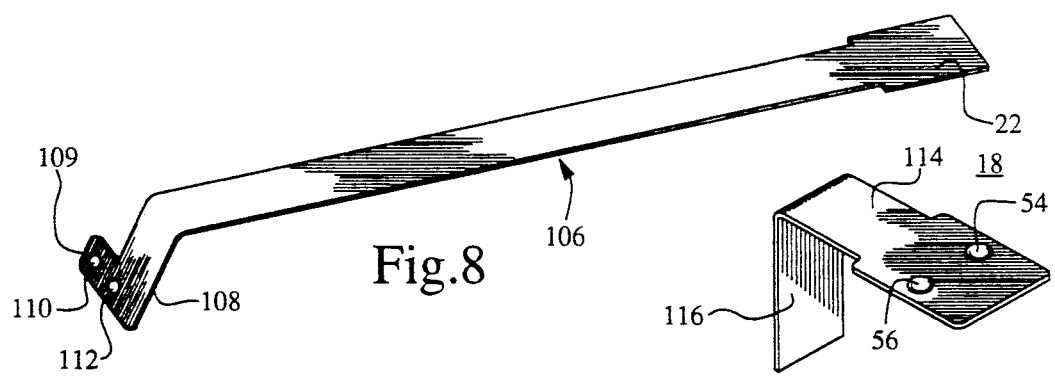
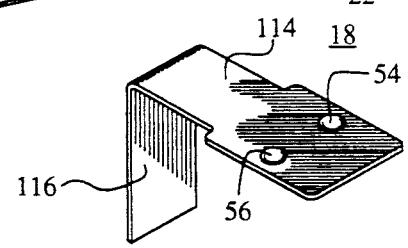
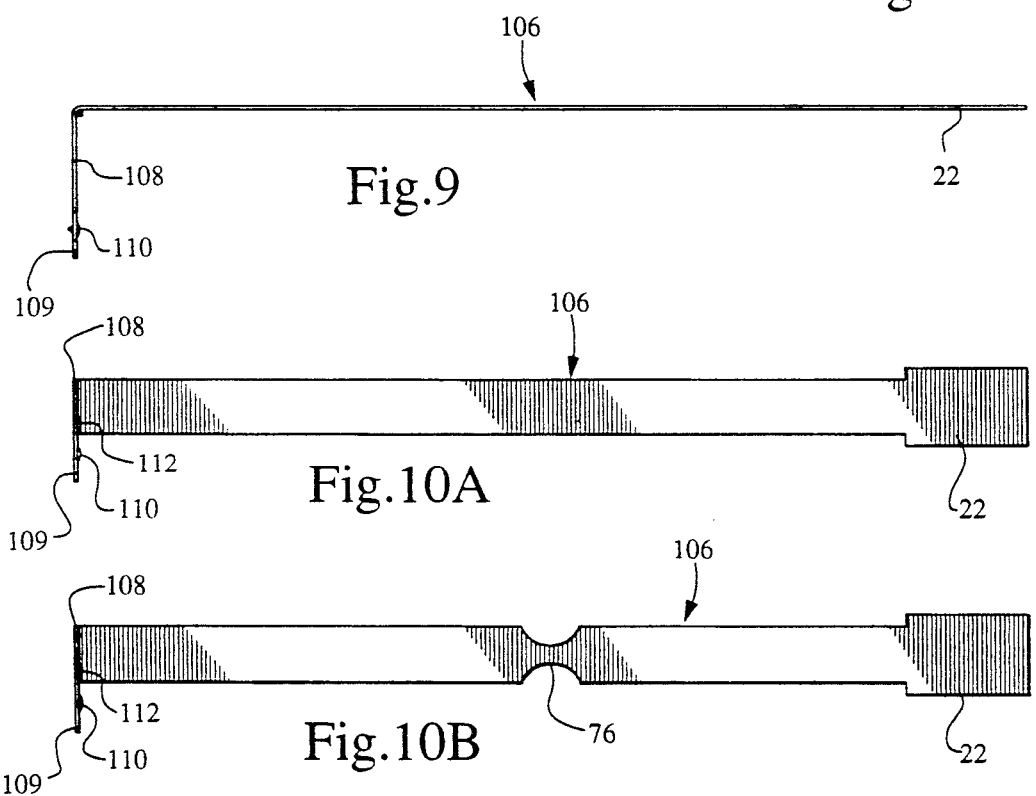
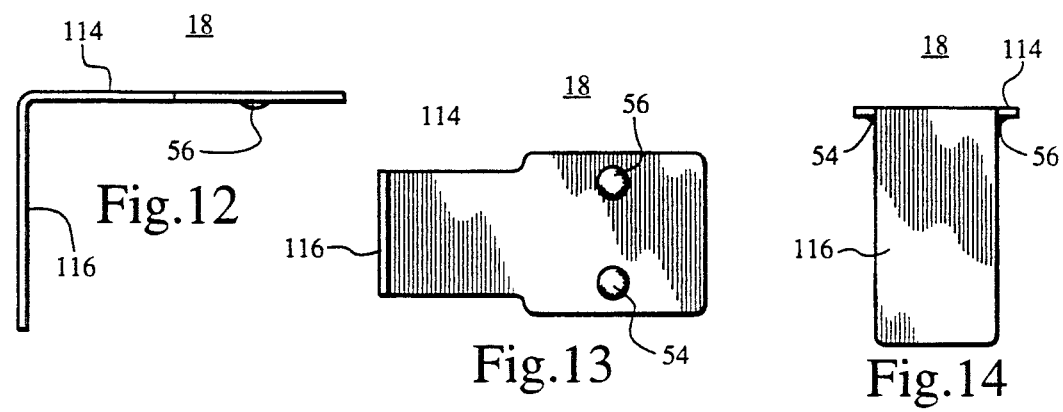

BATTERY PACK

FIELD OF THE INVENTION

The present invention relates to battery packs in general and in particular to a rechargeable battery pack that can be inserted in a tool for operation thereof.

BACKGROUND OF THE INVENTION

Rechargeable battery packs for insertion in various tools are well known in the art. Generally speaking, these devices usually require two or more batteries electrically connected in series arrangement and encased in some type of housing with an exposed positive and negative terminal for making contact with corresponding terminals in the power tool in which the battery pack is inserted. In general, these battery cells are constructed such that the outer casing is actually the negative terminal of the battery. When a plurality of such batteries are arranged one on top of the other and electrically coupled to each other, the positive terminal is the terminal on the uppermost battery and the negative terminal is the casing of the lowermost battery. The casing of any battery is at a potential equal to the sum of the voltages of the batteries under it. In order to have both the positive and negative terminals near the same end of the battery pack, a connection must be made to the casing of the lower battery and be brought to the top of the pack near the positive terminal. In the prior art, this is done with use of shielded wires which protect the wire and prevent it from making electrical contact with the casings of the uppermost batteries. In another prior art embodiment, the casings are wrapped with an insulating material and a connector is brought from the bottom of the lower casing alongside the battery cells to the top of the battery pack. Further, a fuse element is normally provided for such batteries in the circuit between the positive and negative terminals. In one instance it is in the insulated wire going from the casing of the lower battery to the top of the battery pack. Thus a bulky casing is required to accommodate the size of the fuse in the insulated wire. Further, if multiple voltages are to be provided by the battery pack, an extra terminal is provided at the top of the pack and is connected in some means to a casing of one of the batteries to provide a different voltage than that available at the positive terminal with respect to the negative terminal.

Further, in the prior art, the positive terminal is usually exposed on the side and on the edge of the top of the battery pack. Thus, all tools in which the battery pack is to be used must be specifically designed either to make contact on the side or at just the top edge of the battery pack.

Also, in the prior art battery packs, the positive and negative terminals are generally located 180° from each other in a diametrically opposed relationship with any terminal for a different voltage being located 90° from either the positive or negative terminal.

Additionally, in the prior art, the battery casings are formed of unitary plastic construction thus making it difficult to modify, work on, or disassemble the battery pack for any reason.

The present invention overcomes the disadvantages of the prior art by providing a positive terminal that is exposed on one side of the battery pack and continuously across the top of the battery pack to the center thereof to allow for a variety of tool and charger configuration uses. In addition, the housing itself is designed to provide insulation of the positive terminal on the side of the battery pack from contacting the casing of the uppermost battery.

Further, the negative terminal is an elongated metal strip that extends from the base of the lowest battery to the uppermost portion of the battery pack. It is insulated from the battery casings by the housing itself. No insulating tape or sleeve is required to be placed over the battery cell casings. In addition, the positive and negative terminals are located 90° apart at the top of the battery pack.

Further, an opening is provided in the upper side of the battery pack between the positive and negative terminals to expose the casing of the uppermost battery cell. This opening can be used to make electrical contact with the upper cell, thus providing a different voltage than that which is available at the positive terminal. Thus the tool can make contact directly with the side of the uppermost cell for a low speed tap. No separate part is required to create a terminal.

Also, a fuse link is located in a flat metal strip that either connects two of the batteries in series or in the negative terminal which extends from the base of the lowermost cell to the top of the battery pack. The fuse link, if on the side of the battery in the negative terminal, is exposed in a slot in the side of the battery pack where it can be readily ascertained if the fuse has opened.

Also, the battery pack casing is formed in two halves in a clamshell-type construction which snap together over the stacked batteries to form an integrated battery pack. A locking cap not only provides a mechanism which secures the two halves of the battery housing assembly together but also provides the mechanism that locks the battery housing assembly into the tool in which the battery pack is placed. The locking mechanism comprises a T-shaped projection on the locking cap on each side of the battery pack. The T-shaped portion requires no outwardly extending projections for locking the pack into the tool and thus can be inserted in a smaller space in the tool than the prior art battery packs.

A removable end cap is inserted in the locking cap which prevents the locking cap from being removed from the tool or shifted from its proper position for alignment purposes.

Thus it is an object of the present invention to provide a rechargeable battery pack that is formed by a housing having split sections that are detachably connected to each other, the housing sections having integrally formed therein passageways for the positive and negative terminals to provide insulation of the terminals from the battery cells.

It is also an object of the present invention to provide a battery pack in which the positive terminal is exposed continuously from the top center of the battery pack to and partially down one side thereof to allow for variety of tool and charger configuration use.

It is a further object of the present invention to provide a negative terminal in the form of an elongated metallic strip extending from the base of the lowermost cell alongside of the battery pack to the top with the negative terminal being positioned 90° from the positive terminal and being accessed only from the sides.

It is still another object of the present invention to provide a fuse link in the negative terminal by reducing the cross-sectional area of the elongated ribbon-type connector in one location by an amount sufficient to destroy the reduced area in the event of a predetermined amount of current flowing in the ribbon connector forming the negative terminal.

It is a further object of the present invention to provide a low speed electrical tap with an opening formed in the uppermost portion of the side of the housing between the positive and negative terminals such that the casing of the uppermost battery can be directly contacted only from the side of the battery pack.

It is also an object of the present invention to provide a fuse link formed of a thin metallic ribbon connector having a reduced cross-section in one area with the fuse link located either between the middle and lower battery cell or in the negative electrode extending from the bottom of the lowermost cell to the top of the battery pack.

It is yet another object of the present invention to provide a locking cap which has resilient levers in the shape of a "T" that engage with corresponding depressions in the tool to lock the battery pack in the tool.

It is still another object of the present invention to provide an end cap which serves as a locking mechanism to aid in proper alignment of the housings and the lock cap as well as to secure the assembly together.

SUMMARY OF THE INVENTION

Thus the present invention relates to a rechargeable battery pack for use in a power tool comprising a plurality of axially aligned battery cells forming a series circuit having an anode at one end and a cathode at the other end as outputs, each of said battery cells having an outer casing as its cathode, a housing surrounding and containing the battery cells, a positive and a negative terminal exposed on one end of the housing for forming external electrical voltage connections, a ribbon-type conductor having one end forming the exposed negative terminal and the other end coupled to the cathode of the series circuit, the positive terminal being coupled to the anode of the series circuit, means forming part of the housing for supporting the ribbon-type conductor and the positive terminal and insulating the ribbon-type conductor and the positive terminal from the battery casing, and means attached to the housing for removably locking the battery pack in the power tool.

BRIEF DESCRIPTION OF THE DRAWINGS

These and other objects of the present invention will be more fully understood in conjunction with the accompanying drawings in which like numerals indicate like components and in which:

FIG. 3 is a top view of the novel battery pack;

FIG. 5A is a bottom view of the novel battery pack;

FIG. 5B is a cross-section through FIG. 1 illustrating the housing insulating the negative terminal;

FIG. 6 is a side view of the lower portion of the battery pack illustrating the locking cap;

FIG. 7 is a top view of the locking cap itself;

FIG. 8 is an isometric view of the ribbon conductor used as the negative terminal of the battery pack;

FIG. 9 is a side view of the ribbon conductor of FIG. 8;

FIG. 10A is a front view of one embodiment of the ribbon conductor of FIG. 8;

FIG. 10B is a front view of an alternate embodiment of the ribbon conductor with the fuse element formed therein;

FIG. 11 is an isometric view of the ribbon-type conductor used as the positive terminal;

FIG. 12 is a side view of the positive terminal illustrated in FIG. 11; FIG. 13 is a front view of the positive terminal of FIG. 11; FIG. 14 is an end view of the positive terminal of FIG. 11.

DETAILED DESCRIPTION OF THE DRAWINGS

Figures 1, 2:
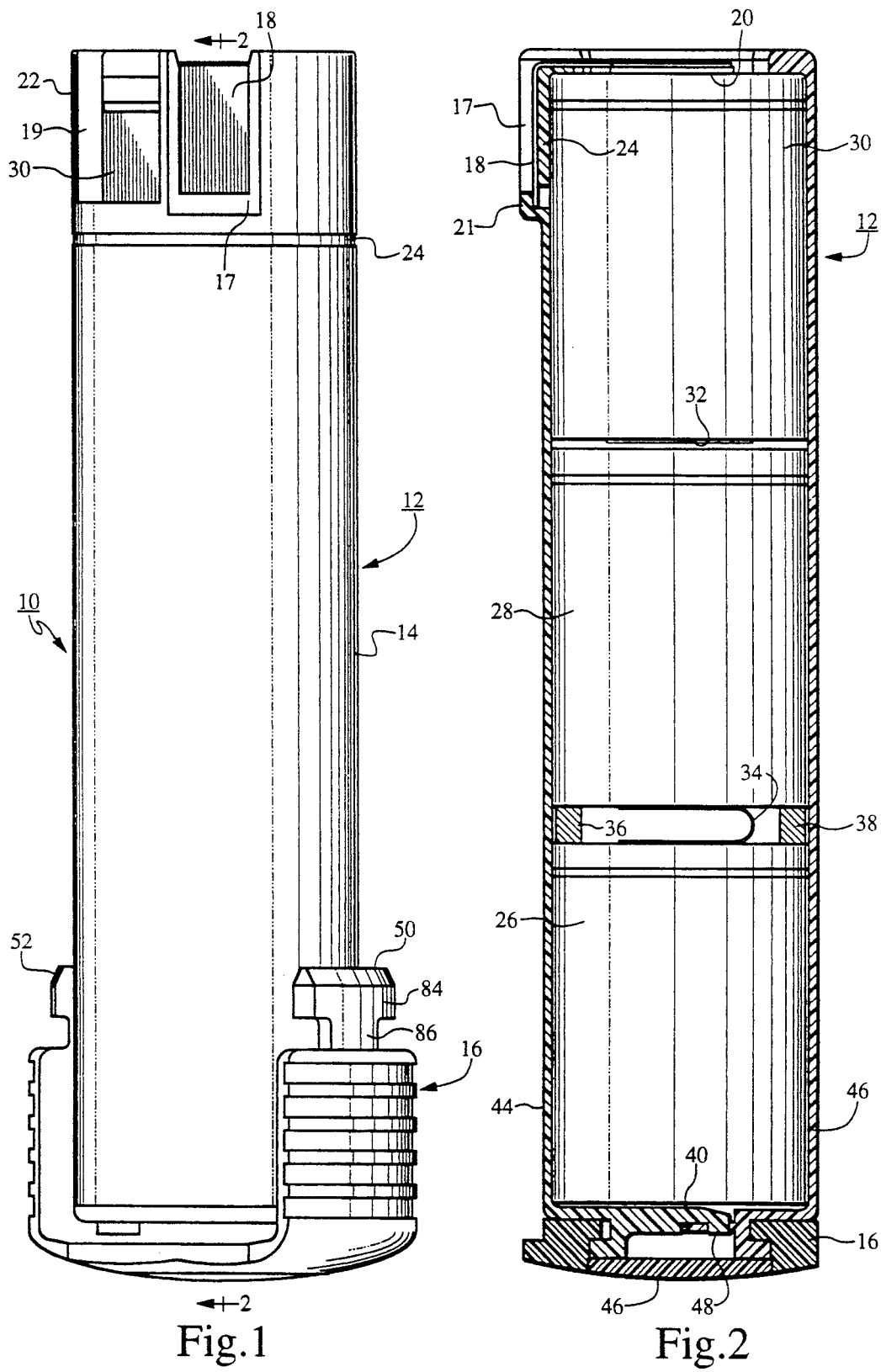
FIG. 1 is a side view of the novel battery pack facing the positive terminal.
FIG. 2 is a cross-sectional view of the battery pack taken along lines 2—2 of FIG. 1.

A side view of the novel battery pack 10 is illustrated in FIG. Battery pack 10 comprises a plastic housing 12 divided into two halves or a "clamshell" configuration as will be shown hereafter. It is covered with a PVC shrink wrap tubing 14 to assist in forming an integral unit. The PVC shrink tubing 14 extends from the base of the battery pack upwardly to a gap 24 just below terminals 18, 30 and 22. The lower portion of the housing 12 from gap 24 downwardly has a slightly smaller diameter than the upper portion such that when the PVC shrink tubing is tightly shrunk around the housing 12, there will be the small gap 24 which does not exceed 0.040". The shrink wrap tubing 14 has a thickness of approximately 0.005", which brings the diameter of the lower section of the housing 12 to the diameter of the upper portion above gap 24. It will be noted in FIG. 1 that a gap 17 in housing 12 exposes the positive terminal 18 for a short distance along the side of the battery pack 10. In like manner, an opening 19 in the casing 12 exposes the outer casing 30 of the uppermost battery which is the negative terminal for that battery.

Three batteries 26, 28 and 30 are shown placed in an end-to-end relationship in the housing 12 in FIG. 2 although more or less could be used. An electrical connection 34 is formed as a fusible element as will be shown hereafter and is placed in the space formed by a spacer ring shown in cross section as numerals 36 and 38 that separates batteries 26 and 28 and electrically couples battery 26 to battery 28. In the event of excessive current drain, fusible element 34 opens the circuit so that current can no longer flow. Cells 26, 28 and 30 may, for example only, be 1.2 volts each, thus making the entire battery pack voltage 3.6 volts when measured from the positive terminal to the negative terminal. Since the casing of cell 30 is coupled to the positive terminal of cell 28, the potential of the casing of cell 30 with respect to the base 40 of battery cell 26 is 2.4 volts in the example given. Thus in FIG. 1, the opening 19 in the housing 12 provides access to the casing of cell 30, thus providing 2.4 volts that may be used to reduce the speed of the motor in which the device is placed. It can be seen in FIG. 2 that the positive terminal 18 exposed in the opening 17 of the housing 12 extends upwardly and across the top of cell 30 where it may be attached in any well known manner such as by welding to the positive terminal 20 of cell 30. Thus positive terminal 18 may be accessed from either the side or the top of the battery pack 10 continuously from the center to the side.

It will be noted that the base of the left half 44 of housing 12 shown in FIG. 2 has a projection 48 extending therefrom which is flexible and can be inserted in a corresponding slot in the right half 46 of the housing 12 to lock the halves together. As will be seen hereafter, the upper portion of the housing 12 also has projections which snap into corresponding slots to lock the two halves together. Once the two halves are latched to each other, the PVC shrink tubing 14 may be applied to the outside of the housing 12 to assist in forming an integrated unit. Also as can be seen in FIG. 2, a locking cap 16 is removably attached to the base of the housing 12 not only to assist in holding the two halves 44 and 46 together but also to insure proper alignment of the interlocking elements so that the battery pack 10 can be inserted properly in the tool in which it is to be used. Also an end cap 42 is associated with the locking cap 16 and the housing 12 to prevent the unit from becoming disassembled.

FIG. 3 is a top view of the novel battery pack 10. As can be seen in FIG. 3, the positive terminal 18 fits in a slot 58 that extends across the top of the housing 12 from one side to and beyond the center thereof. It may then be attached to the positive terminal of the upper cell 30 in any well known means such as by welding at spots 54 and 56. The two halves 44 and 46 of the housing 12 are held together by projections 60 and 62 on housing section 46 that extend into corresponding slots 61 and 63 in housing section 44. Locking cap 16 has T-shaped projections 50 and 52 extending upwardly and outwardly for latching into the power tool in which the battery pack is to be inserted as will be shown in more detail hereafter. Thus it is clear from FIG. 1 and FIG. 3 that the positive terminal 18 can be accessed easily from the side or from an area on the top of the housing that extends continuously more than halfway across the top of the housing 12. The negative terminal 22 is accessible only from the side of the housing 12 and the tap terminal 30, which is the outer casing of upper cell 30, is also accessible only from the side through opening 19 in the housing 12.

Figure 4A:
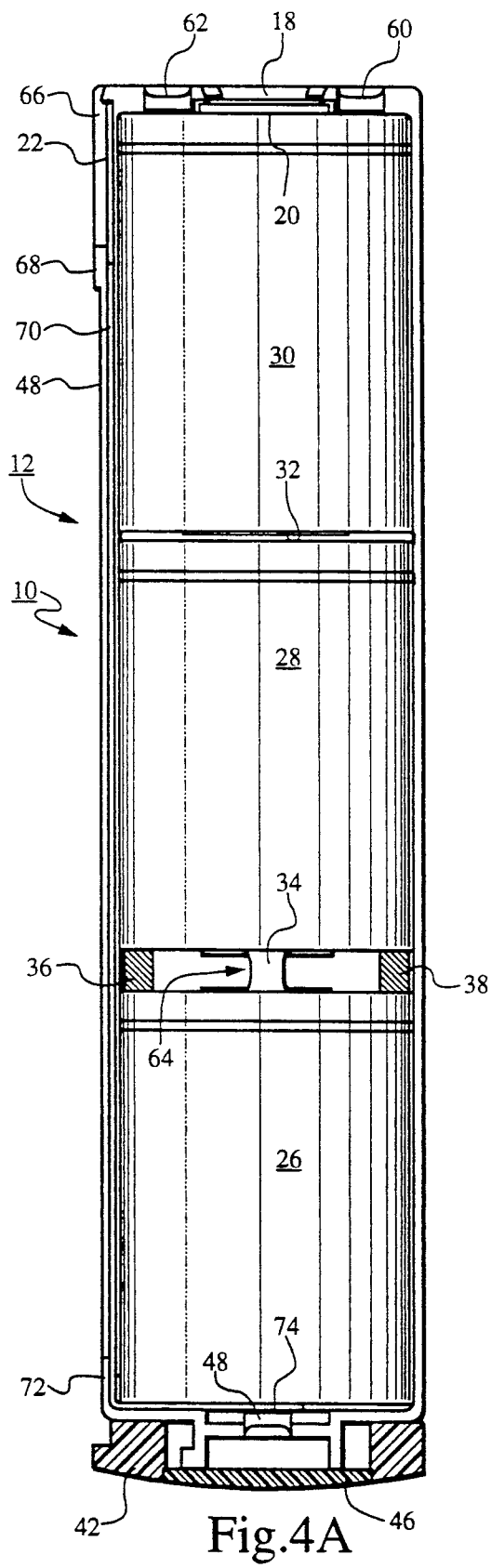
FIG. 4A is a cross-sectional view taken along lines 4A—4A of FIG. 3.

FIG. 4A is a cross-sectional view of the casing taken along lines 4A—4A of FIG. 3. In this view, only one half 48 of the housing 12 is illustrated since the section is taken along the lines where the two housing halves 44 and 46 come together. In this view, the ribbon conductor fuse 34 can be seen between and connecting cells 26 and 28. It has been reduced in cross-section as illustrated at 64 in a manner well known in the art by an amount sufficient to "open" when excess current is passed therethrough thus protecting the battery pack 10. In gap 66 in the housing can be seen the negative terminal 22 which is the upper portion of an elongated conductive ribbon extending from the bottom of cell 26, where it is attached by any well known means such as welding, and up the side of the housing 12 in a slot formed by the housing as will be more clearly seen in FIG. 4B and FIG. 5B. An opening 66, as can best be seen in FIG. 4B, in housing 12 exposes the upper portion of the negative terminal 22 for contact with the terminals in the tool in which the battery pack is used. Also as can be seen in FIG. 4A, projections 60 and 62 from the other housing half 46 extend into slots in the top of the other housing half or clamshell 44 for attaching the two clamshells 46 and 44 together. The positive terminal 18 is shown welded at 54 and 56 to the positive terminal 20 of upper battery cell 30. At the bottom of the battery pack 10 can be seen the projection 48 from one housing section which extends into a slot on the opposite housing section to latch the bottom portion of the clamshell halves 44 and 46 together.

Figure 4B:
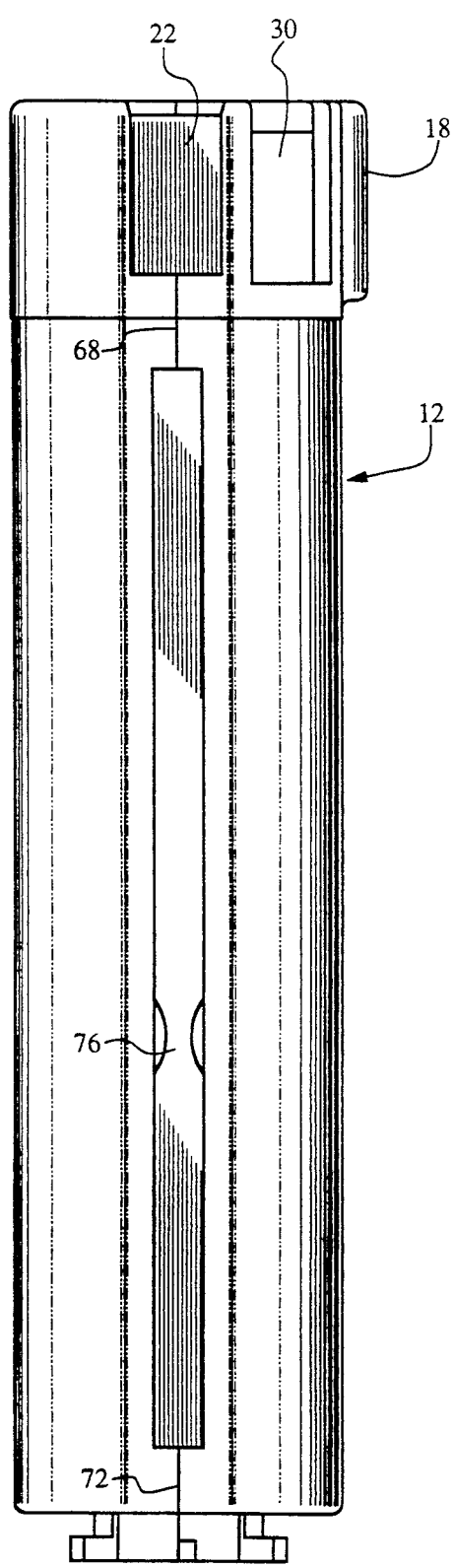
FIG. 4B is a side view of the battery pack facing the negative terminal.

FIG. 4B is a side view of the novel battery pack 10 as viewed facing the negative terminal 22. The elongated negative terminal 22 generally is recessed in a slot 70 (FIG. 4A) with the front portion thereof exposed as illustrated in FIG. 4B. It is covered entirely only at areas 68 and 72 where the plastic extensions on the two halves come together to provide a covering over the terminal 22. If desired, the fusible element may be formed in the elongated terminal 22 as illustrated at 76. The value of having the fusible element in the negative terminal 22 is to enable it to be exposed in the side of the battery pack so that in the event fuse 76 opens, it can be visible from the outside of the battery pack without disassembling it.

FIG. 5A is a bottom view of the novel battery pack 12 housing without the locking cap 16 thereon. Projection 48 from clamshell half 44 is shown projecting through slot 78 to latch the two bottom halves 44 and 46 together. The two vertically extending projections 80 and 82 enable the locking cap to be placed thereover and rotated to lock themselves under the projections 80 and 82. A projection 84 is formed on one side thereof to mate with a corresponding slot in the locking cap such that the locking cap can be placed on the bottom portion of the housing 12 in only one direction.

FIG. 5B is a cross-section taken through FIG. 1 and illustrates the slot 70 formed by the housing halves 44 and 46 to encompass and surround the edges of the negative terminal 22 to hold it in place along the side of the housing 12.

FIG. 6 is a side view of the lower part of the battery pack 10 illustrating the locking cap 16. The body portions 88 on each side have a corresponding T-shaped portion 50 and 52 as shown. Each of the T-shaped portions 50 and 52 has a transverse portion 84 and an arm 86 that is perpendicular to the transverse portion 84 and which is integrally formed with the body portion 88. The depending arm portion 86 is narrower in width than the transverse portion 84 thus generally forming a "T" shape. The body portions 88 with the T-shaped portions 50 and 52 extend into the tool by pressing inwardly on both of the sides 88 to allow the T-shaped portion 50 or 52 to pass over a T-shaped recess in the tool on each side thereof so that the T-shaped projection 50 and 52 will be matched with its corresponding T-shaped recess and lock the battery pack into the tool.

FIG. 7 is a top view of the locking cap 16 illustrating the arms 88 with the T-shaped projections 50 and 52 thereon. The center portion of the locking cap 16 is open and has diametrically opposed arcuate sections 90 and 92 for receiving the flanges 80 and 82 on the bottom of the battery pack housing 12. When rotated clockwise in FIG. 7, the projecting ledges 94 and 96 will pass over the top of the flanges 80 and 82 on the bottom of the battery housing 12 thus attaching the locking cap 16 to the bottom of the battery pack housing 12. An indentation 98 mates with the projection 84 on the bottom of the housing 12 when the locking cap 16 is first attached to the base so that flanges 80 and 82 shown in FIG. 5 will mate with corresponding arcuate sections 90 and 92 in only one direction. Thus flange 80 in FIG. 5 must mate with arcuate section 92 and flange 82 must mate with arcuate section 90. If they were reversed, the small projection 84 would strike ledge 96 and would not allow the locking cap 16 to be mounted on the base.

This is important because there are occasions when two of the battery packs must be inserted side by side in a tool to provide greater power. In such case, the flat spot 100 on one side of the locking cap 16 must abut a corresponding flat spot on the adjacent locking cap of the additional battery pack. If the arcuate side of the locking cap 16 were adjacent to the other battery pack, the two battery packs could not fit in the tool. As will be seen hereafter, once the locking cap 16 has been attached to the base of the battery pack 12 and rotated to be locked thereto, an end cap 42, which will be discussed hereafter in relation to FIGS. 15 and 16, has locking tabs which fit in the slots 102 and 104 to prevent rotation of the locking cap 16. Thus the various parts are all held in a unitary manner in proper relationship to each other.

FIG. 8 is an isometric view of the ribbon-type negative terminal 22. It has an elongated body portion 106 with the upper portion 22 serving as the terminal. The lower portion 108 is bent at right angles to the body portion 106 and has a foot portion 109 with weld areas 110 and 112 which can be used to weld the foot portion 108 to the base of the lowest battery cell. FIG. 9 is a side view of the elongated negative terminal and FIG. 10A is a front view. FIG. 10B is an alternate front view illustrating a fuse portion 76 made by reducing the width of the negative electrode by removing portions thereof in a manner well known in the art sufficient to cause the portion of reduced area 76 to vaporize or melt when current flow exceeds a predetermined amount. The importance of placing the fusible element 76 in the negative electrode 22 is shown in FIG. 4B because it is visible on the side of the housing 12 thus enabling the user to determine if the fuse has been "blown."

FIG. 11 is an isometric view of the positive terminal 18. It has a top portion 114 which attaches to the top of the housing 12 and is fastened to the positive terminal of the uppermost battery in some well known means such as weld spots 54 and 56. The vertical portion 116 which is bent at right angles to the horizontal portion 114 extends partially down the side of the housing 44 in an opening therein and is held in place by lip 21 shown in FIG. 2 with casing or housing 24 in back of it. Thus the positive terminal 18 is held rigidly in place from the center of the top of the battery pack 10 continuously to one edge and down the side thereof a predetermined distance so that contact with the positive terminal can be made either with the top or the side of the battery pack. FIG. 12 is a side view of the positive terminal 18, FIG. 13 is a bottom view and FIG. 14 is an end view.

Figure 15:
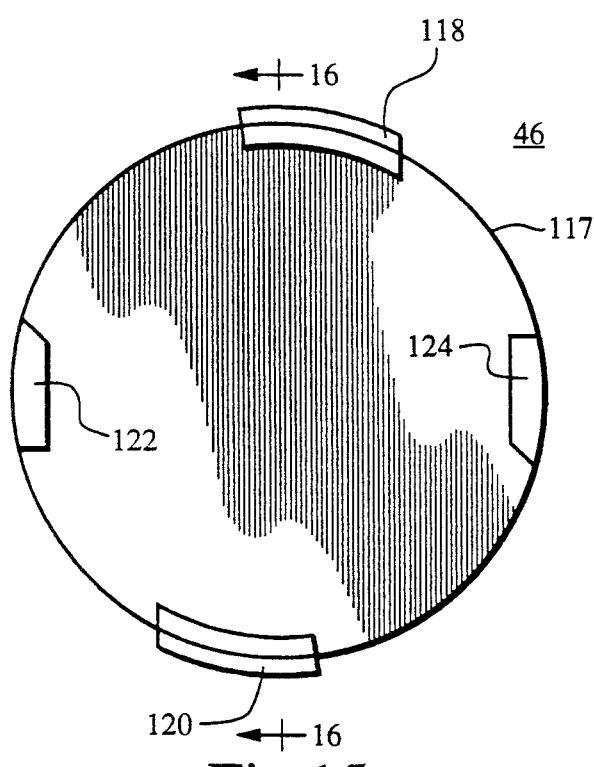
FIG. 15 is a top view of the end cap.
Figure 16:
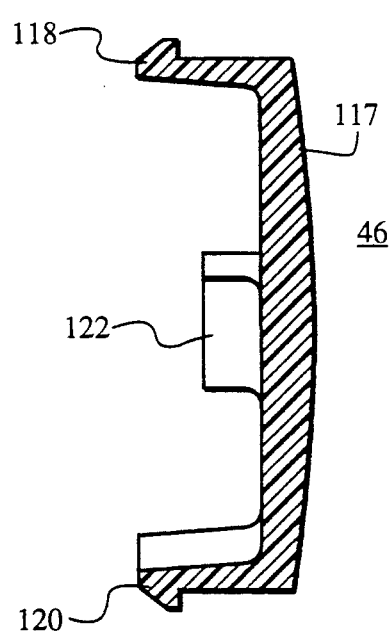
FIG. 16 is a cross-sectional view of the end cap of FIG. 15.

FIG. 15 is a top view of the end cap 42. End cap 42 has a circular body 117 with pliable projections 118 and 120 thereon that mate with slots 102 and 104 respectively in the locking cap 16. The projections 118 and 120 are bent inwardly to allow them to bypass the arcuate portions 90 and 92 and then snap into the slots 102 and 104 to hold the cap in place. Raised portions 122 and 124 rest against flanges 80 and 82. This combined with projections 118 and 120 resting against the side of ledges 94 and 96 is what locks the cap 16 in place preventing rotation of lock cap 16. The raised portions 122 and 124 contact the locking cap 16 and thus limit the distance the end cap 46 can be inserted into the locking cap 16.

Thus there has been disclosed a novel battery pack for use in a power tool that utilizes a plurality of axially aligned battery cells forming a series circuit. The cells have an anode at one end and a cathode at the other end as outputs. A housing surrounds and contains the battery cells and a positive and a negative terminal are exposed in one end of the housing for forming external electrical voltage connections. A ribbon-type conductor has one end forming the exposed negative terminal and the other end coupled to the cathode of the series coupled battery cells. The positive terminal is coupled to the anode of the series circuit and extends continuously in an exposed condition across the top of the battery pack and down the side of the battery pack a predetermined distance. The housing itself has a slot down the side thereof for supporting the ribbon-type negative conductor and insulating the negative conductor from the battery casings which serve as the cathodes for each of the cells. A locking cap and end cap are removably attached to the base of the power pack for holding all the elements in proper aligned relationship and enabling the battery pack to be removably connected to a power tool. The positive and negative terminals are spaced from each other 90° at the top of the battery pack. An intermediate voltage terminal is exposed in an opening between the positive and negative terminals such that all three terminals are exposed within a 90° arc.

The housing is formed of first and second halves formed of a non-metallic material such as plastic with mating locking tabs on each end of the halves to assist in locking the halves together. Slots are formed in the wall of the halves for receiving and containing the ribbon connector forming the negative terminal and the ribbon conductor forming the positive terminal.

A fuse element can be formed in the circuit either between two of the axially aligned cells or in the elongated negative terminal. The fuse element can be made by reducing the cross-sectional area of the ribbon-type conductor as is well known in the art to provide a cross-sectional area that will conduct current up to a predetermined amount and then melt, thus opening the circuit.

The locking cap that is removably coupled to one end of the housing has first and second resilient T-shaped projections extending upwardly from the cap body portion in spaced relationship with the housing. The T-shaped projections are capable of being flexed inwardly to allow them to enter the power tool and lockingly engage a corresponding recess with the power tool. The locking cap has an opening in the center thereof with first and second horizontal projections extending inwardly from the opening. First and second corresponding spaced flanges are formed on the bottom of the housing such that the flanges can be mated with and rotated under the horizontal projections on the cap to lock the cap to the housing. The locking cap has a flat spot on one side of the body portion spaced at right angles with respect to the upwardly extending T-shaped projections.

A flat spot is formed on one side of the locking cap body portion and is spaced 90° with respect to the upwardly extending projections. A recess is formed on one of the horizontal cap projections and a projection is formed on the base of the battery housing such that the locking cap will attach to the battery housing in only one position where the recess receives the projection in mating relationship so that the flat spot on one side of the locking cap body portion is always in a fixed position with respect to the battery housing.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A battery pack for use in a power tool comprising:
   a plurality of axially aligned battery cells forming a series circuit having an anode at one end and a cathode at the other end as outputs;
   each of said battery cells having an outer casing as its cathode;
   a housing surrounding and containing said battery cells;
   a positive and a negative terminal exposed on one end of said housing for forming external electrical voltage connections;
   a ribbon-type conductor having one end forming the exposed negative terminal and the other end coupled to the cathode of the series circuit;
   said positive terminal being coupled to the anode of said series circuit;
   means forming part of said housing for supporting said ribbon-type conductor and insulating said ribbon-type conductor from said battery casing; and
   means attached to said housing for removably locking said battery pack in the power tool.

2. A battery pack as in claim 1 wherein:
   said positive terminal is exposed in the center of one end of said housing; and
   said negative terminal is exposed in a first opening on one side of the housing at said one end.

3. A battery pack as in claim 2 further comprising:
   a second opening in said one end of said housing continuously extending from the positive terminal in the center of said one end of said housing partially down the side of said one end of said housing;
   said second opening being spaced 90 from said first opening;
   ribbon connector rigidly attached to said positive terminal and being exposed in said second opening such that electrical connection to said positive terminal can be made from the top and the side of said housing; and
   means forming part of said housing for supporting said ribbon connector and electrically insulating said ribbon connector from the adjacent battery casing.

4. A battery pack as in claim 3 further comprising:
   a third opening formed in the housing side at said one end to expose the casing of the adjacent battery, said casing supplying a voltage different from that supplied by said positive terminal with respect to said negative terminal;
   said third opening being located between, and 45° from, said first and second openings; and
   said first, second and third openings being formed in a 90° quadrant.

5. A battery pack as in claim 4 further comprising:
   first and second non-metallic wall halves forming said housing;
   mating locking tabs on each end of said halves to assist in locking said halves together; and
   slots formed in the wall halves for receiving and containing the ribbon connector and the ribbon conductor for both support and electrical insulation.

6. A battery pack as in claim 5 further comprising a fuse in said circuit between said positive and negative terminals for opening said series circuit in the event of a current overload condition.

7. A battery pack as in claim 6 wherein said fuse comprises an area of the ribbon-type connector between the negative terminal and the series circuit cathode having a reduced cross-section to limit current flow in the series circuit to a predetermined amount.

8. A battery pack as in claim 6 wherein said fuse comprises:
   a U-shaped conductive ribbon welded at one end to the casing of one of said battery cells and welded at the other end to the positive terminal of the adjacent cell terminal; and
   an area of said U-shaped conductive ribbon having a reduced cross-section that melts at a predetermined current flow to open the series circuit and limit the current flow and the series circuit to a predetermined amount.

9. A battery pack as in claim 8 further comprising a spacer between said one battery cell and the adjacent cell such that when said reduced area melts on overload an open circuit occurs.

10. A battery pack as in claim wherein said means for removably locking said pack in said power tool comprises:
    a locking cap removably coupled to the other end of said housing, said cap having a body portion; and
    first and second resilient T-shaped projections extending upwardly from said cap body portion in spaced relationship with said housing, said T-shaped projections being capable of being flexed inwardly to allow the T-shaped projections to enter the power tool and lockingly engage with said power tool.

11. A battery pack as in claim 10 further comprising:
    first and second spaced inwardly facing horizontal projections on said caps; and
    first and second corresponding spaced outwardly facing flanges on the bottom of said housing such that said flanges can be mated with and rotated under said horizontal projections to lock said cap to said housing.

12. A battery pack as in claim 11 further comprising:
    a flat spot on one side of said locking cap body portion being spaced 90° with respect to said upwardly extending projections;
    a recess on one of said horizontal cap projections; and
    a projection on the base of the battery housing such that the locking cap will attach to the battery housing in only one position where the recess receives the projection in mating relationship so that the flat spot on one end of the locking cap body portion is always in the same fixed position with respect to the battery housing.

13. A battery pack as in claim 10 further including:
    an opening substantially in the center of said locking cap;
    a slot on one side of each of said horizontal projections; and
    an end cap with resilient fingers for mating with said slots to lock said end cap to said locking cap and simultaneously prevent rotation of said locking cap with respect to said battery housing.

14. A battery pack as in claim 1 further including:
    a reduced diameter battery housing below said exposed terminals; and a shrink wrap plastic covering surrounding only said reduced diameter housing to assist in forming a unitary battery pack.

15. A battery pack as in claim 14 wherein said plastic has a thickness substantially equal to one-half of the reduced diameter to form a housing of substantially constant diameter over the length of the battery pack.

16. A unitary rechargeable battery pack comprising:

at least first and second axially aligned battery cells coupled to each other in electrical series;

an insulated housing surrounding and enclosing said cells, said housing including complementary halves detachably connected to each other;

first, second and third electrical terminals for providing a first positive voltage, a second positive voltage and a third negative voltage, respectively; and first, second and third openings in one end of said battery pack for exposing said first, second and third terminals for electrical connection, said openings being accessible for connection in a 90° quadrant of one end of the battery pack.

17. A battery pack as in claim 16 wherein:

said first opening in said housing extends substantially across the top of said housing and partially down the side of said housing; and said first terminal for said positive voltage is a conductive ribbon that extends continuously in said first opening from the top center of said battery pack to the edge and partially down the side of the battery pack such that electrical connection to the positive terminal can be made from both the top and the side of the housing.

* * * * *

UNITED STATES PATENT AND TRADEMARK OFFICE
CERTIFICATE OF CORRECTION

PATENT NO. : 5,122,427
DATED : June 16, 1992
INVENTOR(S) : Dal M. Flowers and James R. Hartmann It is certified that error appears in the above-identified patent and that said Letters Patent is hereby corrected as shown below:

Column 9, Line 39, "90" should read --90°--.

Column 10, Line 25, after "claim" and before "wherein" insert --1--.

Signed and Sealed this

Twenty-fourth Day of August, 1993

Attest:

BRUCE LEHMAN

Attesting Officer        Commissioner of Patents and Trademarks